United States Patent
Brammer

(10) Patent No.: US 12,028,472 B1
(45) Date of Patent: Jul. 2, 2024

(54) CELL PHONE GRIP WITH SPEAKER AND BATTERY

(71) Applicant: Catharine Brammer, Woolwine, VA (US)

(72) Inventor: Catharine Brammer, Woolwine, VA (US)

( * ) Notice: Subject to any disclaimer, the term of this patent is extended or adjusted under 35 U.S.C. 154(b) by 318 days.

(21) Appl. No.: 17/543,118

(22) Filed: Dec. 6, 2021

(51) Int. Cl.
*H04M 1/02* (2006.01)
*H04R 1/02* (2006.01)
*H04R 3/00* (2006.01)

(52) U.S. Cl.
CPC .......... *H04M 1/0281* (2013.01); *H04R 1/028* (2013.01); *H04R 3/00* (2013.01); *H04R 2420/07* (2013.01)

(58) Field of Classification Search
CPC ....... H04M 1/0281; H04R 1/028; H04R 3/00; H04R 2420/07
USPC ...................................................... 455/556.1
See application file for complete search history.

(56) References Cited

U.S. PATENT DOCUMENTS

| | | | | |
|---|---|---|---|---|
| 10,098,444 | B1* | 10/2018 | Deetjen | A45F 5/021 |
| D847,805 | S * | 5/2019 | Lederer | D14/250 |
| 10,806,552 | B1* | 10/2020 | Demoss | A61C 15/04 |
| 2018/0101197 | A1* | 4/2018 | Barnett | A63F 13/98 |
| 2018/0157290 | A9* | 6/2018 | Barnett | G06F 1/1632 |
| 2019/0089822 | A1* | 3/2019 | Gartz | F16M 11/14 |
| 2019/0304291 | A1* | 10/2019 | Camp | G08B 25/009 |
| 2020/0348766 | A1* | 11/2020 | Nahum | G11B 27/005 |
| 2020/0349873 | A1* | 11/2020 | Nahum | G09G 3/001 |
| 2022/0103667 | A1* | 3/2022 | Chiang | H05K 5/0221 |
| 2022/0116491 | A1* | 4/2022 | Chiang | F16M 11/38 |

* cited by examiner

*Primary Examiner* — April G Gonzales
(74) *Attorney, Agent, or Firm* — Sanchelima & Associates, P.A.; Christian Sanchelima; Jesus Sanchelima

(57) ABSTRACT

A cell phone grip with speaker and battery including a top portion assembly, a bottom portion assembly, an electrical assembly. The top portion assembly includes a top member having a truncated cone shape. The bottom portion assembly includes a bottom member having a truncated cone shape. The top member mounted on the bottom member defines a grip member. Said grip member is capable of being expanded and collapsed. The electrical assembly is located inside the grip member. The electrical assembly includes a battery and a speaker. Said battery solving the problem of having to carry an external battery for when the cell phone runs out of battery. The speaker is connected via Bluetooth™ to a portable electronic device.

9 Claims, 4 Drawing Sheets

CELL PHONE GRIP WITH SPEAKER AND BATTERY

BACKGROUND OF THE INVENTION

1. Field of the Invention

The present invention relates to a cell phone grip with speaker and battery and, more particularly, to a cell phone grip with speaker and battery that is comfortable and represents an update to regular cell phones grips by including a rechargeable battery for charging a cell phone and a speaker to be connected to an electronic device wirelessly.

2. Description of the Related Art

Several designs for a cell phone grip with speaker and battery have been designed in the past. None of them, however, include a grip conveniently enclosing a rechargeable battery that is easy to carry and a wireless speaker.

Applicant believes that a related reference corresponds to U.S. Pat. No. 10,806,552 issued for an expandable cellphone gripping device with a dental floss dispenser. Applicant believes that another related reference corresponds to U.S. Pat. No. 10,098,444 issued for a cell phone case with a rechargeable battery and speaker [title of reference]. None of these references, however, teach of a cell phone grip with speaker and battery having an expandable disc shaped gripping unit that is attached to the back side of a mobile phone and contains a Bluetooth™ speaker and battery unit that can be used wirelessly with the attached mobile phone.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a cell phone grip with speaker and battery that solves the problem of a cell phone running out of battery on the road without the need for a charging bank.

It is another object of this invention to provide a cell phone grip with speaker and battery that includes a powerful speaker for hearing music with better audio quality.

It is still another object of the present invention to provide a cell phone grip with speaker and battery that solves the tiresome problem of having to carry several devices.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
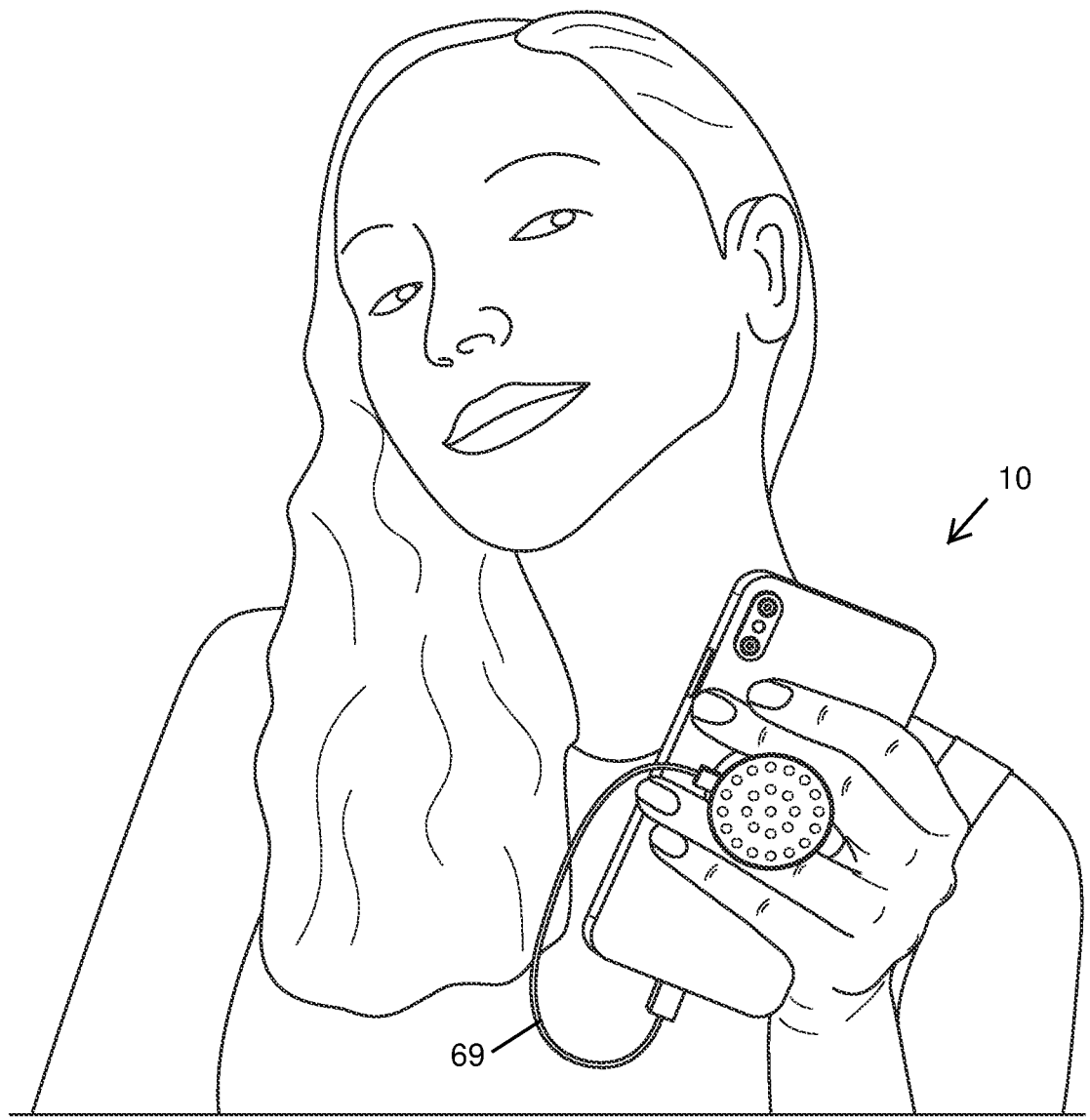
FIG. 1 represents an isometric operational view wherein a user is charging a portable electronic device 72 using the cell phone grip with speaker and battery 10 and a charging cord 69.
Figure 2:
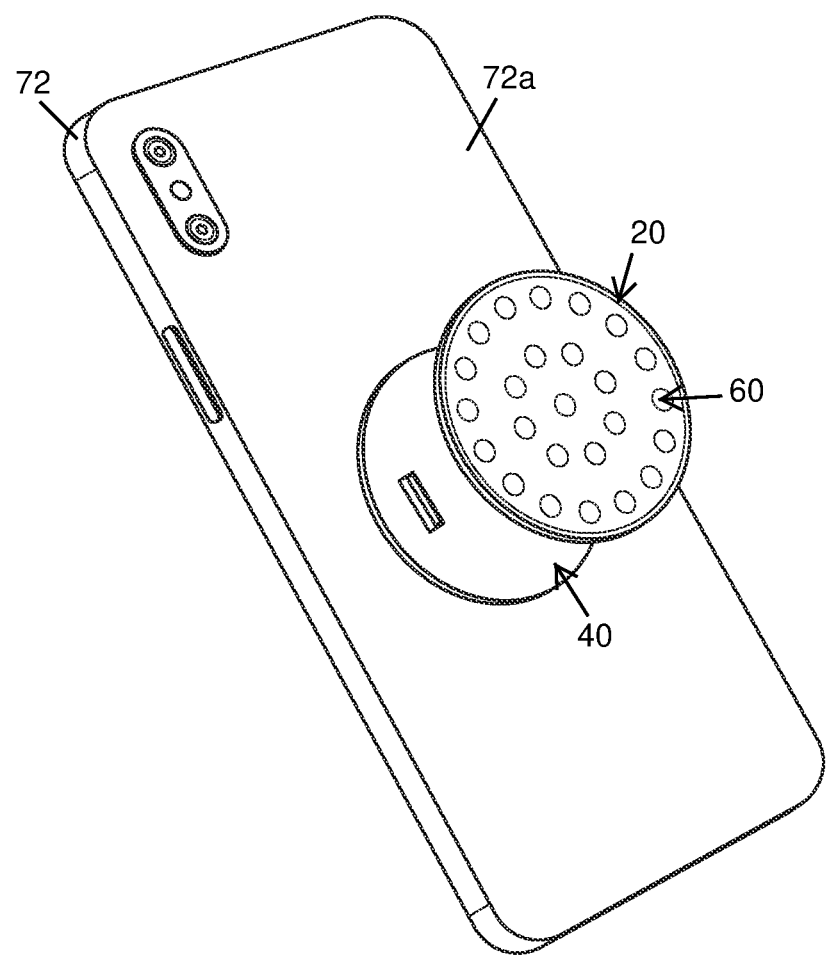
FIG. 2 shows an isometric view of the present invention 10 mounted on a rear surface 72a of a portable electronic device 72. The present invention 10 including a top portion assembly 20, a bottom portion assembly 40, and an electrical assembly 60.
Figure 3A:
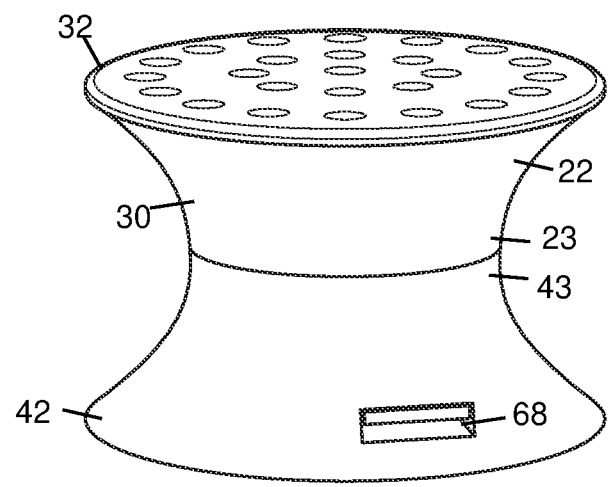
FIG. 3a illustrates an isometric view of the top member 22 mounted onto a bottom member 42 by means of a top end 43 and a bottom end 23. The top member 22 mounted on the bottom member 42 configure a grip 30. Said grip 30 is in expanded configuration 32.
Figure 3B:
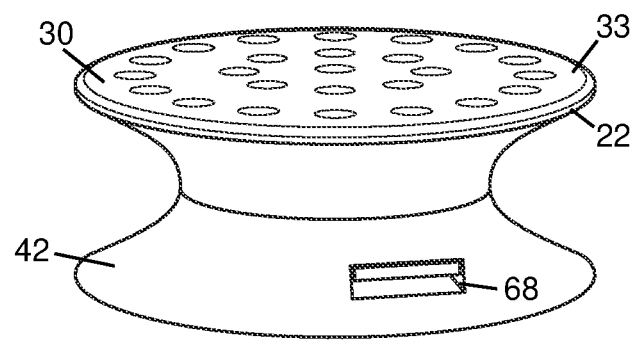
FIG. 3b is a representation of the grip 30 in a contracted configuration 33. Please draw image 4
Figure 4:
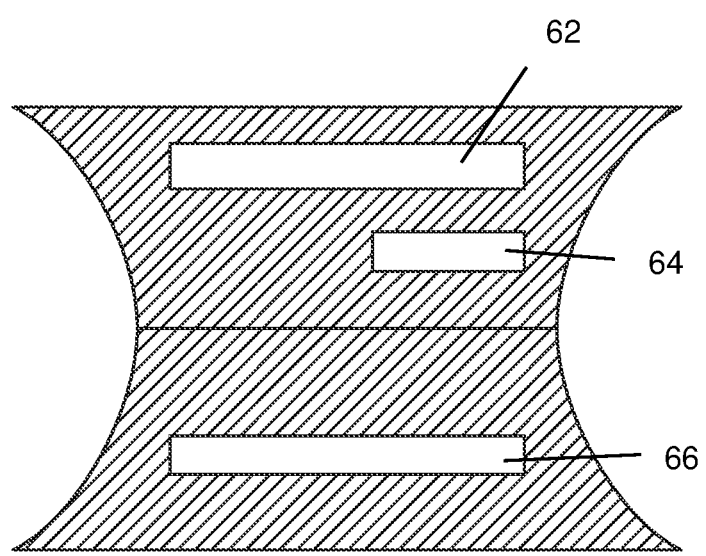
FIG. 4 depicts a cross section view of the grip 30 that encloses the battery 66, the speaker 62, and the receiver unit 64.

Referring now to the drawings, where the present invention is generally referred to with numeral 10, it can be observed that it basically includes a top portion assembly 20, a bottom portion assembly 40, and an electrical assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The top portion assembly 20 includes a top member 22. Top member 22 may have a truncated conic shape. In other embodiments the top member 22 may have a cylindrical shape, a cuboid shape, a truncated pyramid shape, an irregular shape, or any variation thereof. Top member 22 is volumetric. Top member 22 is hollow. Top member 22 may be made of acrylic, polycarbonate, polyethylene, polypropylene, polyethylene terephthalate, polyvinyl chloride, acrylonitrile-butadiene-styrene, wood, metal, or any variation thereof. In a suitable embodiment said top member 22 is made of plastic. Top member further includes a bottom end 23.

The bottom portion assembly 40 includes a bottom member 42. Bottom member 42 may have a truncated conic shape. In other embodiments the bottom member 22 may have a cylindrical shape, a cuboid shape, a truncated pyramid shape, an irregular shape, or any variation thereof. Bottom member 42 is volumetric. Bottom member 42 is hollow. Bottom member 42 may be made of acrylic, polycarbonate, polyethylene, polypropylene, polyethylene terephthalate, polyvinyl chloride, acrylonitrile-butadiene-styrene, wood, metal, or any variation thereof. In a suitable embodiment said bottom member 42 is made of plastic. Bottom member further includes a top end 43. Top end 43 receives the bottom end 23. Top end 43 and bottom end 23 are capable of being retracted and extended. The top member 22 mounted on the bottom member 42 at the top 43 and bottom end 23 configure a grip 30.

The grip 30 has a preconfigured height that is the sum of a height of the top member 22 and a height of the bottom member 42. The grip 30 is telescopic. The top member 22 is capable of sliding in and out from the bottom member 42, lengthening or shortening the height of the grip 30. Grip 30 has an expanded configuration 32, and a contracted configuration 33.

The electrical assembly 60 includes a speaker 62, a receiver unit 64, a battery 66, a charging port 68, and a charging cord 69. Speaker 62 converts an electrical audio signal into a corresponding sound. Speaker 62 is enclosed by the top member 22. Receiver unit 64 is enclosed by the top member 22. Receiver unit 64 may receive a signal having format of an electromagnetic radiation, such signal may be audio, supersonic, ultrasonic, infrared, RF, Wi-Fi, Bluetooth™, or any variation thereof. In a suitable embodiment said receiver unit 46 uses Bluetooth™ technology. The receiver unit 64 is connected with the speaker 62. In a suitable embodiment the receiver unit 64 is connected to said speaker 62 by means of electric wires. The receiver unit 64 is configured to be connected wirelessly to a portable electronic device 72. The receiver unit 64 receives a wireless signal from the portable electronic device wherein said signal carries sound information. The receiver unit 64 transmits said signal to the speaker 62. Speaker 62 receives and amplifies said signal to reproduce the sound information carried by the signal. Battery 66 is enclosed by said bottom member 42. Battery 66 may be a primary battery or a secondary battery. Primary batteries are single use or disposable whereas secondary battery is a type of battery that can be recharged. Battery 66 provides electrical energy to charge up an external device. In a suitable embodiment battery 66 is a lithium-ion battery. Nevertheless, in another embodiment battery 66 may be a Li-ion battery. Said battery 66 may provide a suitable amount of voltage and current for charging portable electronic devices. The charging port 68 is located on the bottom member 42. Charging port 68 permits to charge portable electronic device 72 using a charging cord 68. The charging port 68 may be an USB-A type port, an USB-C type port, a lightning type port, a micro-USB type port or any variation thereof. The charging port 68 may be connected to the battery 66. Charging cord 68 is a cable used to transfer electrical energy from the battery to the portable electronic device 72.

The portable electronic device 72 is a piece of lightweight, electrically powered equipment. Portable electronic device 72 may be used for communication, data processing, computing, and the like. Portable electronic device 72 may be able to send data wirelessly such as sound information. Portable electronic device 72 include a rear surface 72a wherein the grip 30 is mounted.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cell phone grip with speaker and battery, comprising:
   a) a top portion assembly including a top member;
   b) a bottom portion assembly including a bottom member;
   c) the top member mounted on the bottom member defining a grip member, wherein said top member and said bottom member have a plain and curved outer surface;
   d) an electrical assembly including a speaker, and a battery, said speaker reproduce sound information coming wirelessly from a portable electronic device, the battery is enclosed by said bottom member, wherein said battery is a lithium-ion battery configured to provide an external means for charging the portable electronic device, wherein said battery is charged by means of said charging cord connected to an external power source said grip member is mounted on the portable electronic device, wherein said speaker is embedded in an uppermost end of said top member.

2. The cell phone grip of claim 1, wherein said top member having a truncated cone shape, said top member is volumetric.

3. The cell phone grip of claim 1, wherein said bottom member having a truncated cone shape, said bottom member is volumetric, said bottom member receives the top member.

4. The cell phone grip of claim 1, wherein said electrical assembly further includes a receiver unit connected to said speaker, said receiver unit receive a signal having format of an electromagnetic radiation, such signal may be audio, supersonic, ultrasonic, infrared, RF, Wi-Fi, Bluetooth™, or any variation thereof known in the art.

5. The cell phone grip of claim 4, wherein said receiver unit uses Bluetooth technology.

6. The cell phone grip of claim 1, wherein said electrical assembly further includes a charging port and a charging cord located in the bottom member, said charging port is connected to the battery.

7. The cell phone grip of claim 1, wherein said portable electronic device is capable of sending data such as sound information wirelessly.

8. The cell phone grip of claim 1, wherein said grip member is capable of being expanded and collapsed for augmenting and diminishing, respectively, a height of the grip member defining an expanded configuration and a contracted configuration.

9. A cell phone grip with speaker and battery, consisting of:
   a) a top portion assembly including a top member having a truncated cone shape, said top member is volumetric;
   b) a bottom portion assembly including a bottom member having a truncated cone shape, said bottom member is volumetric, said bottom member receives the top member;
   c) the top member mounted on the bottom member defining a grip member, wherein said top member and said bottom member have a plain and curved outer surface;
   d) said grip member is capable of being expanded and collapsed for augmenting and diminishing, respectively, a height of the grip member defining an expanded configuration and a contracted configuration;
   e) an electrical assembly including a speaker, a receiver unit, a battery and a charging port, said speaker and receiver unit are enclosed by said top member, said speaker is connected to said receiver unit, the receiver unit can be connected to a portable electronic device wirelessly, the receiver unit uses Bluetooth technology, the battery and the charging port are located in the bottom member, wherein said battery is a lithium-ion battery configured to provide an external means for charging the portable electronic device, wherein said battery is charged by means of said charging cord connected to an external power source; and
   f) said portable electronic device is capable of sending data wirelessly such as sound information wirelessly that the receiver unit acquires and transmits to the speaker, the portable electronic device includes a rear surface wherein the grip is mounted, the charging of the portable electronic device by the battery is achieved connecting a charging cord to the charging port and the portable electronic device, wherein said speaker is embedded in an uppermost end of said top member.

* * * * *